United States Patent [19]

Bockenheimer

[11] Patent Number: 5,937,486
[45] Date of Patent: Aug. 17, 1999

[54] CLOSURE ELEMENT MADE OF THERMOPLASTIC MATERIAL

[75] Inventor: Alexander Bockenheimer, Overrath, Germany

[73] Assignee: TRW United-Carr GmbH & Co. KG, Germany

[21] Appl. No.: 08/942,574

[22] Filed: Oct. 1, 1997

[30] Foreign Application Priority Data

Oct. 2, 1996 [DE] Germany .......................... 196 40 835

[51] Int. Cl.⁶ .................................................. F16B 19/00
[52] U.S. Cl. .......................... 24/297; 24/114.6; 24/289; 411/908
[58] Field of Search .............................. 24/297, 289, 304, 24/114.6; 411/908, 907, 504, 506, 507

[56] References Cited

U.S. PATENT DOCUMENTS

| 3,110,068 | 11/1963 | Perrochat | 24/297 |
|---|---|---|---|
| 3,367,809 | 2/1968 | Soloff | 411/908 |
| 3,475,794 | 11/1969 | Seckerson | 24/297 |
| 4,687,396 | 8/1987 | Berecz | 411/908 |
| 5,301,396 | 4/1994 | Benoit | 24/297 |
| 5,314,282 | 5/1994 | Murphy et al. | 411/908 |
| 5,319,839 | 6/1994 | Shimajiri | 24/297 |

*Primary Examiner*—Victor N. Sakran
*Attorney, Agent, or Firm*—Fay, Sharpe, Beall, Fagan, Minnich & McKee, LLP

[57] ABSTRACT

A closure element is provided made of plastic, particularly for sealing off at least one opening 2, 3 in at least one support member 20, 30, in particular, in a automotive body, the closure element including a head section 4 located above the support, and a basic body portion 5 extending through the support 20, 30. At least one region of the closure element is made of a material which expands under the influence of temperature. The basic body portion 5 and the head section 4 of the closure element 1' is preferably formed of a single piece of thermal plastic material, which, is with increased thermal influence, media-tight bondable via a gluing action within the openings 2, 3.

20 Claims, 2 Drawing Sheets

CLOSURE ELEMENT MADE OF THERMOPLASTIC MATERIAL

BACKGROUND OF THE INVENTION

The subject invention is directed toward the art of plastic closure elements and, more particularly, to plastic closure elements or seal plugs that include a body section extending through at least one opening in at least one support or panel, an enlarged head section on one side of the support or panel, and a thermal expanding material disposed on at least one area of the closure element, the thermal expanding material being adapted to expand under the influence of temperature to seal the at least one opening.

The invention is especially well suited for incorporation in automotive body panels and will be described with reference thereto; however, as will become apparent, the invention is capable of broader application and could be incorporated in a variety of components or used as a separate fastener for many purposes.

Other closure elements made of plastic and a thermal expanding material are already known in the art such as shown in German patent number DE 40 18 425 A1. In the above prior art example, the closure element includes a hollow space defined in the body of the closure element. The hollow space is filled with at thermal expanding medium which, after installing the closure lid in a support opening, expands under the influence of temperature to thus press areas of the closing lid against adjacent areas of the support opening. This results in producing a closure of the support opening. One problem with closure elements having the above-known construction is that it is necessary to take special design and manufacturing measures in order to provide the hollow space in the body of the closure element.

In addition to the above, other closure caps are known which are made of plastic and which have, at respective opposing top and bottom ends thereof, a sealing lip, which acts upon the adjacent surfaces in the area of the support opening. Examples of this type of closure cap are DE-OS 35 12 582, DE-OS 30 11 448 and GB-PS 1354973.

One problem all of the above closure caps experience is the possibility of unintentional separation from the support opening before the thermal expanding material has had an opportunity to expand and seal the support opening and attach the closure element thereto. Thus, with the above closure caps, provisions must always be provided by means of additional fixtures or additional structural elements on the closure cap in order to ensure that the closure element remains fastened to the respective support opening until such time as the thermal expanding material has had an opportunity to expand and seal fastening the closure element to the opening.

SUMMARY OF THE INVENTION

The subject invention provides an arrangement which overcomes the shortcomings discussed above in connection with known seal plugs and provides a water-tight closure of at least one support opening and a relatively functionally safe and secure attachment to the support member with a closure element having a simple construction.

In accordance with the invention, there is provided an improved plastic closure element for closing at least one opening in at least one operatively associated support member. The closure element includes a body portion and a head segment, each being formed from a single piece of thermoplastic material, which under the influence of an increase in temperature, is expandable and bondable through agglutination with the opening and its surrounding area within the support member.

In accordance with another aspect of the invention, the closure element is formed having a simple design consisting of a basic body portion and a head section adjacent thereto whereby both areas are adapted to be manufactured quickly and inexpensively together using a thermoplastic material. The material forming the closure element is "media-tight" and, thus, seals against the flow of various fluids including water and oil.

In accordance with yet another aspect of the present invention, the closure element is adaptable to serve simultaneously or separately as a base of a fastening element such as a bolt or screw or the like. In addition, the present invention is useful as a connection element for connecting at least two construction components.

The thermoplastic material forming the closure element of the present invention has the advantageous property that, in the presence of an increase in temperature, the material expands and spreads out against the circumference of the respective support opening to impermeably seal the circumferential region of the support. After installation of the closure element according to the invention in at least one support opening formed in at least one support, the entire closure element needs only to next be exposed to an increase in temperature in order to ensure a media-tight seal of the at least one support opening.

In accordance with a somewhat more limited aspect of the invention, a second embodiment of the invention includes a first section formed into the shape of a flange on an end of a basic body portion formed into the shape of a cone. In this embodiment, the cone-shaped basic body portion is alternatively selectively shaped into a truncated cone, the truncated cone having a bowl-shaped recess formed therein, a narrow bottom end, and a wide top portion connected to the flange. For adjustment to the circumference of the respective support opening, the truncated cone is formed to change shape or transition into a cylindrical-shaped portion at the wide top portion facing the underside of the flange. The cylindrical-shaped portion preferably has a smaller diameter than the cross-section surface of the truncated cone region. Moreover, at the underside of the flange, there is preferably provided a circumferential groove which functions as a provisional auxiliary seal.

In accordance with still yet a somewhat more limited aspect of the invention, a third embodiment includes a projecting spreader region on the basic body portion of the closing element. The projecting spreader region is connected to the cylindrical region traversing the support opening. In this embodiment, a spreader element is receivable into the basic body portion and the flange, the spreader element being moveable into positions effecting an opened and closed spreader region position and further, the spreader element includes a cover portion for covering the flange formed in the first section of the plastic closure element.

In accordance another aspect of the invention, the spreader region consists of several spreader arms which are moveable into a spread position through interaction of a cylindrical region of the spreader element. In this embodiment, the basic body portion has two successively arranged axially spaced apart openings of different diameters whereby the opening of the smaller diameter is located in the area of the spreader arms and is selected to substantially correspond to the outer diameter of an imbedded region formed on the spreader element. The spreader element preferably consists of a plastic material which is stable, even under the influence of high temperature.

BRIEF DESCRIPTION OF THE DRAWINGS

The above and other objects and advantages of the invention will become apparent from the following description when read in conjunction with the accompanying drawings wherein.

DETAILED DESCRIPTION OF THE PREFERRED EMBODIMENT

Figure 1:
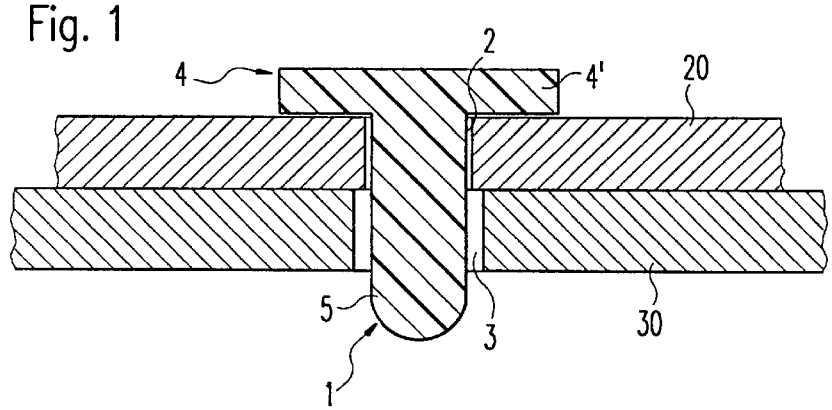
FIG. 1 is a schematic lateral view in section of the closure element constructed according to a first preferred embodiment of the invention shown in a pre-mounted position.

Referring more particularly to the drawings wherein the showings are for the purposes of illustrating the preferred embodiments of the invention only and not for purposes of limiting same, FIG. 1 generally illustrates a closure element 1 according to the present invention, made of plastic, which, in the first embodiment, serves to close two openings 2, 3 respectively formed in two operatively associated support members 20, 30. As shown, each of the two openings 2, 3 have different diameters. The closure element 1 includes a head segment 4 located above support 20. The head segment is preferably formed in the shape of a flange 4'. The flange 4' is followed by a cone formed as a basic body portion 5, the basic body portion extending through the two openings 2, 3 of the two support members 20, 30.

It will be appreciated by those of ordinary skill in the art that the closure element of the present invention is useful separately as shown in FIG. 1 or simultaneously as a base member of a fastening element. Further, the present invention is useful as a connection element for connecting at least two construction components.

According to the present invention, the basic body portion 5 and the flange 4' of the closure element 1 is made from a thermoplastic expandable extruded material. The material, as shown best in FIG. 2, when exposed to an increase of temperature, enters into a blister-formation state and effects a gluing into a media-tight connection and closure of the openings 2, 3 when exposed to an increase of temperature. The blister formation state is also realized with the employed materials.

Figure 4:
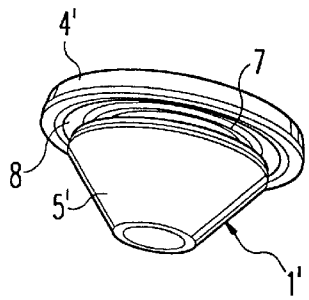
FIG. 4 is a perspective representation of the closure element shown in FIG. 3.
Figure 3:
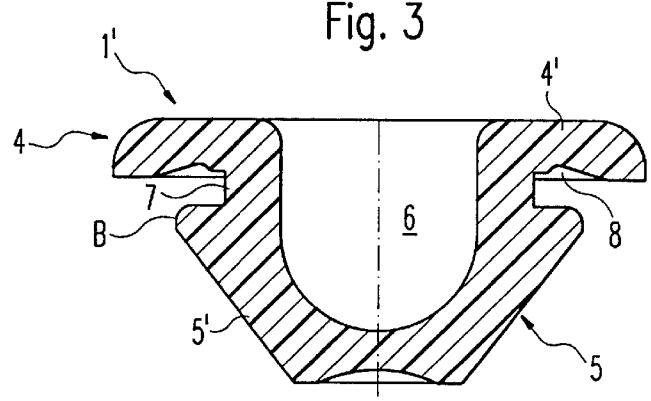
FIG. 3 is a schematic lateral view in section of a second embodiment of the closure element according to the invention.
Figure 5:
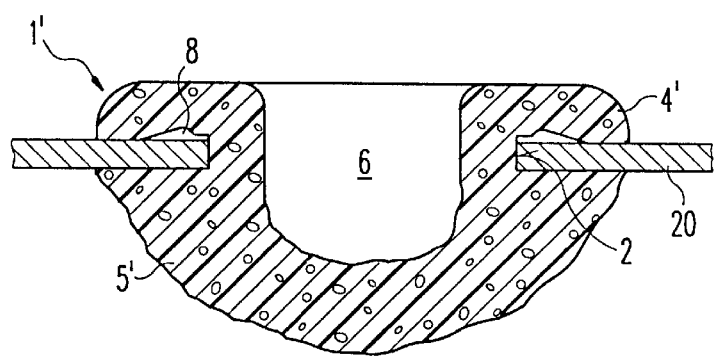
FIG. 5 is a schematic lateral view in section of the closure element shown in FIG. 3 and illustrated in a mounted position after the influence of an increase in temperature.

FIGS. 3–5 show a second preferred embodiment of a closure element 1' according to the invention. In this embodiment, a truncated cone 5' is formed below the flange 4'. The truncated cone 5' serves as the basic body portion. The truncated cone 5' preferably includes a bowl-shaped recess 6. As is best shown in FIG. 3, the truncated cone region 5' changes shape over at an expanded region B facing the underside of the flange 4' into a cylindrical region 7. The cylindrical region 7 preferably has a diameter which is less than a cross section of the surface of the region B of the truncated cone portion 5'. The cylindrical region 7 is particularly useful for connecting the closure element into the support openings.

Further as shown in FIGS. 3 and 4, the underside of the flange 4' is equipped with a circumferential groove 8. In that manner, the exterior circumference of the flange 4' forms a sealing lip between the closure element and the support opening. The sealing lip engages the surface of the support 20 in an annular region surrounding the opening 2. As best shown in FIG. 4, the circular region of engagement between the sealing lip and the support opening is preferably circularly continuous and spaced apart from the edge of the rim of the support opening.

FIG. 5 illustrates the plastic closure element of the second preferred embodiment after having undergone the thermal expanding effect. As shown in that figure, the closure element 1' is installed in a support opening 2 of an operatively associated support member 20. As shown there, the closure element has undergone blister formation and gluing action to bond the closure element to the opening 2 at a circumferential region of the support 20 so that the support opening 2 is media-tight sealed.

Figure 2:
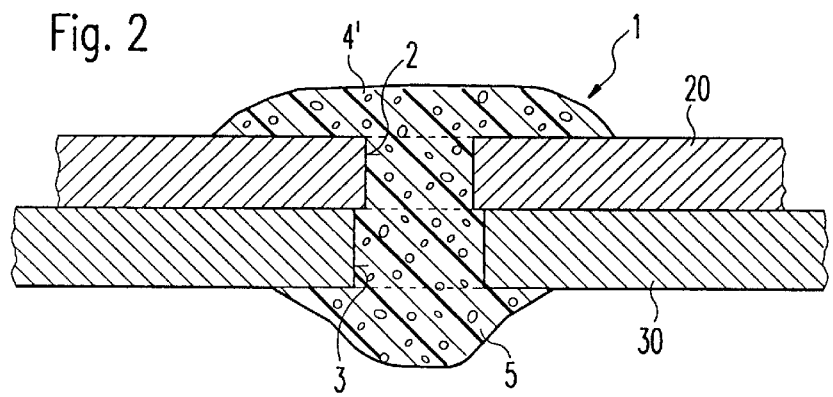
FIG. 2 is a schematic lateral view in section of the closure element shown in FIG. 1 and illustrated in a mounted position after the influence of an increase in temperature.

The closure element 1 according to the first preferred embodiment as shown in FIGS. 1 and 2 and the closure element 1' according to the second preferred embodiment as shown in FIGS. 3–5 are each respectively constructed as a single piece having a unitary construction. That is, the closure elements 1, 1' are formed entirely of the thermal expanding plastic material. According to FIGS. 6–8, the third preferred embodiment of the present invention is a closure element 1" which is formed in two pieces, each piece being formed of a different material.

Figure 6:
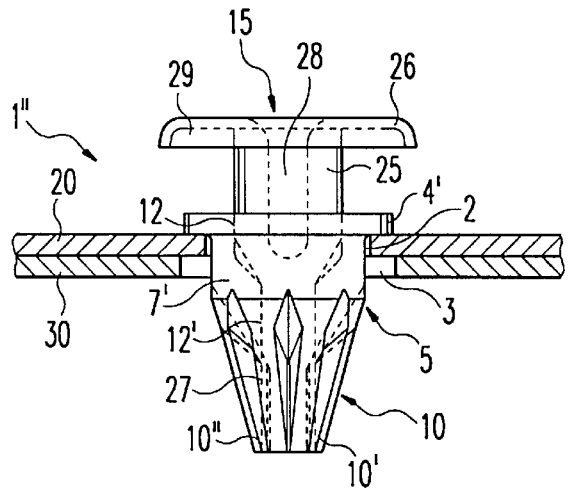
FIG. 6 is a schematic lateral view of a third embodiment of the closure element according to the present invention illustrated in a delivery position.
Figure 7:
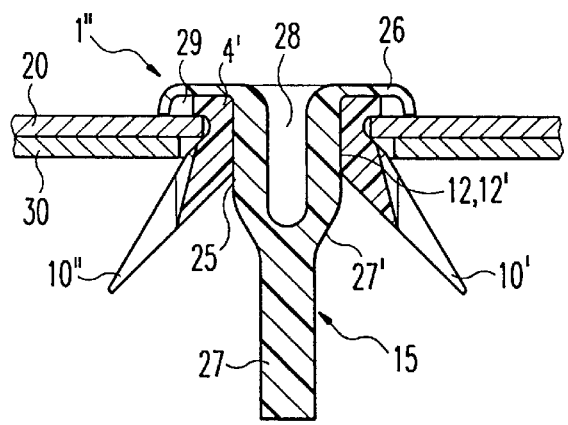
FIG. 7 is a schematic lateral view in section of the closing element shown in FIG. 6 and illustrated in a pre-melt-bonding position; and, FIG. 8 is a schematic lateral view of the closure element shown in FIGS. 6 and 7 illustrated in a mounted position after melt-bonding following the influence of an increase in temperature.
Figure 8:
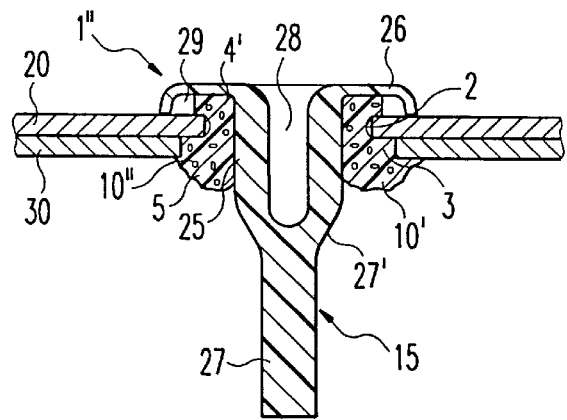

With reference now to FIGS. 6–8, the basic body portion 5 includes a spreader region 10 which protrudes from the support opening 2, 3. The spreader region 10 is followed by a cylindrical region 7' traversing and extending through the respective support openings. According to FIGS. 6 and 7, the spreader region preferably consists of several spreader arms 10, 10'" circumferentially disposed around said cylindrical region 7'.

In addition to the above, the basic body portion includes two successively arranged internal openings 12, 12', the openings 12, 12' are axially spaced apart as shown and, in addition, each is preferably formed having a diameter different from the other. The opening 12' has a smaller diameter and is located in the region of the spreader arms 10, 10".

The closure element of the third preferred embodiment includes a separate spreader element 15 which, as best illustrated in FIG. 7, consists of a cover flange 26, a cylindrical region 25, and a lead-in inbedment region 27. Preferably, a bowl-shaped recess 28 is formed in the cylindrical region 25 of the spreader element 15.

FIG. 6 illustrates the delivery state of the third preferred embodiment of the invention. With reference now particularly to that figure, the embedment region 27 is located in the opening 12' having the smaller diameter formed in the basic body portion 5. The cylindrical region 25 is located above the flange 4'. In this delivery state, the two-piece closure element 1" is easily installed into the two openings 2, 3 having different diameters in a manner that the cylindrical-shaped region 7' of the basic body traverses both of the openings 2, 3, whereby flange 4' is positioned on the upper side of the support member 20.

FIG. 7 illustrates the connection state of the closure element whereat the spreader element 15 is pressed into the two openings 12, 12' of the basic body portion 5. In that position, the spreader region 10 opens up and the plurality of spreader arms 10, 10' assume a spread-open position. The longitudinal or axial motion of the spreader element is facilitated by the shape of the cone region 27' between the cylindrical region 25 and the inbedment region 27. In the position illustrated, the cylindrical region 25 traverses the openings 12, 12' formed in the basic body portion.

In the installed state as shown in FIG. 7, the cover flange 26 of the spreader element 15 includes a free space 29 formed on an underside thereof covering the flange 4'.

Upon exposure to a temperature increase, the material forming the basic body portion 5 undergoes a deformation, for example a blister formation and gluing state, and thereby expands and seals off the openings 2, 3 as best shown in FIG. 8. The result is a media-tight closure of the two openings 2, 3. In addition, an aesthetically pleasant effect achieved because the cover flange 26 of the spreader element 15 covers over the thermoexpanded body portion on the side of the top support member 20.

Although the spreader arms 10, 10' are illustrated as being elongated members, those of ordinary skill in the art would appreciate that the spreader arms can be formed of any type or number. However, it is important that the spreader arms be moveable to radiate outwardly as illustrated from the delivery position depicted in FIG. 6 to the installed position depicted in FIG. 7 at which position the spreading operation of the spreader arms takes place behind the support 20 or 30 to grip the closure element to the support members 20, 30.

Thus, according to the present invention, the closure element 1, 1', 1" easily media-tight seals openings having a range of different diameters without regard for whether the multiple openings 2, 3 have different diameters in each of the respective stacked support member openings.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A plastic closure element for closing at least one opening in at least one operatively associated support member, the closure element comprising:
   a head segment adapted to be located on a first side of said support member; and,
   a body portion adapted to extend through said at least one opening in the at least one support member, the head segment and the body portion of the closure element being adapted to completely cover the at least one opening and being formed as a unitary construction of a thermoplastic material which is responsive to a temperature increase to expand and bond the closure element to a circumferential region surrounding the at least one opening in the at least one support member to thereby seal the at least one opening.

2. The plastic closure element according to claim 1 wherein the head segment and the body portion substantially define a cone.

3. The plastic closure element according to claim 2 wherein the head segment and the body portion substantially define a truncated cone.

4. The plastic closure element according to claim 3 wherein the head segment and the body portion substantially define a truncated cone having a bowl-shaped recess.

5. The plastic closure element according to claim 3 wherein:
   the head segment defines an enlarged flange adapted to engage said first side of the support member; and,
   the body portion substantially defines a truncated cone having an expanded region facing an underside of said enlarged region.

6. The plastic closure element according to claim 5 wherein the body portion forms a cylindrical region between said enlarged flange and said expanded region, the cylindrical region being adapted to fit within said at least one opening in said at least one operatively associated support member.

7. The plastic closure element according to claim 6 wherein said cylindrical region has a diameter less than a cross-sectional diameter of the expanded region of the truncated cone of the body portion.

8. The plastic closure element according to claim 7 wherein said enlarged flange is immediately adjacent to said cylindrical region.

9. The plastic closure element according to claim 8 wherein said head segment includes a circumferential groove defined in an underside of said enlarged flange.

10. The plastic closure element according to claim 1 wherein:
    said body portion includes:
       a substantially cylindrical region adapted to traverse said at least one opening in the at least one support member; and,
       an expanded region formed adjacent to the cylindrical region and extending radially outwardly from the cylindrical region and adapted to engage the at least one support member; and,
    the head segment includes:
       a radially extending circumferential flange formed adjacent to the cylindrical region and being adapted to engage said first side of the at least one support member, the expanded region and the flange selectively cooperatively holding the closure element in place in the at least one opening prior to said temperature increase.

11. A plastic closure element for closing at least one opening in at least one operatively associated support member, the closure element comprising:
    a head segment adapted to be located on a first side of said support member;
    a body portion adapted to extend through said at least one opening in the at least one support member, the head segment and the body portion of the closure element being formed as a unitary construction of a thermoplastic material which is responsive to a temperature increase to expand and bond the closure element to a circumferential region surrounding the at least one opening in the at least one support member, the body portion including a substantially cylindrical region adapted to traverse said at least one opening in the at least one support member and a spreader region connected to the cylindrical region and adapted to protrude from said at least one opening in the at least one support member; and, a substantially cylindrical spreader element adapted slide axially through said head segment and into said body portion, wherein the spreader region of the body portion includes a plurality of spreader arms adapted on a first side to engage said cylindrical spreader element and move radially outwardly as the spreader element is moved axially within the spreader region of the body portion.

12. The plastic closure element according to claim 11 wherein the spreader element includes:

on a first end, an elongate embedded region having a first diameter;

an elongate cylindrical region connected to the embedded region, the cylindrical region having a second diameter larger than said first diameter; and, a cover flange on the cylindrical region, the cover flange being adapted to engage said first side of the support member.

13. The plastic closure element according to claim 12 wherein the body portion includes at least two axially spaced apart openings and wherein:

a first opening of said at least two axially spaced apart openings being in said spreader region of the body portion and having a diameter substantially corresponding to said first diameter of the elongate embedded region of the spreader element; and, a second opening of said at least two axially spaced apart openings being in said cylindrical region of the body portion and having a diameter substantially corresponding to said second diameter of the elongate cylindrical region of the spreader element.

14. The plastic closure element according to claim 13 wherein said cover flange includes an underside recess adapted to receive a flange formed by said head segment of the closure element.

15. The plastic closure element according to claim 14 wherein the spreader element includes an elongate recess formed in the elongate cylindrical region thereof.

16. The plastic closure element according to claim 15 wherein the spreader element includes a cone shaped region between said elongate embedded region having said first diameter and said elongate cylindrical region having said second diameter.

17. The plastic closure element according to claim 16 wherein the spreader element is formed of a second thermoplastic material resistive to size and shape changes in a presence of temperature increases.

18. The plastic closure element according to claim 11 wherein the spreader element is formed of a second thermoplastic material resistive to size and shape changes in a presence of temperature increases.

19. The plastic closure element according to claim 11 wherein the spreader element includes:

on a first end, an elongate embedded region;

an elongate cylindrical region connected to the embedded region; and, a cover flange on the cylindrical region adapted to engage said first side of the support member, the cover flange including an underside recess adapted to receive a flange formed by said head segment of the closure element.

20. The plastic closure element according to claim 11 wherein the spreader element includes:

an elongate recess formed in the elongate cylindrical region thereof; and, a cone shaped region between said elongate embedded region and said elongate cylindrical region.

* * * * *